US005206707A

United States Patent [19]

Ott

[11] Patent Number: 5,206,707

[45] Date of Patent: Apr. 27, 1993

[54] APPARATUS FOR THE ANALYSIS OF PRINT CONTROL FIELDS

[75] Inventor: Hans Ott, Regensdorf, Switzerland

[73] Assignee: Gretag Aktiengesellschaft, Regensdorf, Switzerland

[21] Appl. No.: 678,589

[22] Filed: Apr. 1, 1991

[30] Foreign Application Priority Data

Apr. 6, 1990 [CH] Switzerland ........................ 1170/90

[51] Int. Cl.[5] ........................ G01I 3/46

[52] U.S. Cl. ........................ 356/402; 356/406; 356/405; 395/101

[58] Field of Search ........................ 356/402-411; 364/523, 576

[56] References Cited

U.S. PATENT DOCUMENTS 4,947,348 8/1990 Van Arsdell ........................ 364/523

OTHER PUBLICATIONS

European Search Report.

*Primary Examiner*—F. L. Evans
*Assistant Examiner*—K. P. Hantis
*Attorney, Agent, or Firm*—Burns, Doane, Swecker & Mathis

[57] ABSTRACT

A microcomputer controlled manual densitometer for the analysis of print control fields has a manual and an automatic operating mode. In the manual mode the measuring functions desired are selected by the operator, while in the automatic mode the measuring function is selected automatically on the basis of the type of the print control field measured. The densitometer is able to recognize the color of the print control field including overprint situations, and to distinguish between solid-tone fields including overprint situations, and to distinguish between full-tone fields and half-tone fields with two different nominal dot areas. For solid-tone fields the color and the solid-tone density, for overprint fields the ink trap and the overprint color and for half-tone fields the dot gain, the color and the nominal dot area, are detected and displayed. The color recognition is based on the relative variables of grayness and color hue error. Solid-tone and half-tone fields are distinguished by continuously updated, solid-tone density dependent dot area limits for corresponding density limits.

22 Claims, 10 Drawing Sheets

APPARATUS FOR THE ANALYSIS OF PRINT CONTROL FIELDS

BACKGROUND OF THE INVENTION

The invention relates to an apparatus for the analysis of print control fields and in particular offset printing.

At the present time the printing process is primarily controlled by printing control fields which usually are analyzed densitometrically or more recently even colorimetrically, to obtain control variables for the setting and regulation of the printing machine or other relevant information for the printer. In offset printing, in addition to various other control fields, in particular single color solid-tone fields and single color half-tone fields, for all of the colors involved in the printing process, two-color and sometimes even three-color overprinted solid-tone fields are also employed. In the case of single color solid-tone fields the relevant measuring variables are the layer thicknesses of the printing inks involved. The layer thicknesses are determined by the densitometric color densities. In the case of half-tone fields, primarily the dot area in the print or often the dot gain in the basic half-tone film are determined. In the case of overprinted fields, usually the so-called trays of the second (or third) down ink on the first (or second) down ink (inks) is determined.

For the densitometric analysis of such print control fields and the determination of the variables relevant for the printer and for the control and regulation of the printing process, a series of densitometers has been available for a long period of time. Densitometers range from relatively simple manual devices operating off-line through table densitometers (scanning densitometers), to on-line machine densitometers mounted directly on the printing machine, which at the present time are mostly computer controlled and thus are efficient and simplistic in operation. The best known representatives of advanced manual densitometers include the devices with the designation series D183, D185 and D186 of the Gretag AG Co. in Regensdorf, Switzerland.

A characteristic of the practical operation of such manual densitometers is that the operator must position the densitometer on the control fields of interest and, via control elements, manually indicate to the device which of the variables are to be determined and displayed. Many of these devices are already capable of recognizing and displaying the color of the control field (i.e., for example, whether a cyan, magenta, yellow or black field is involved), automatically by certain criteria. However, these devices must still be instructed whether the color density or the dot area or the ink trap is to be determined and displayed and the various functions of the device must therefore still be selected by the operator. A densitometer capable of automatically recognizing the type of the control field being examined and automatically setting its measuring variables would significantly enhance the ease of operating such a device.

In EP-A-O 283 899 (corresponding to U.S. patent application Ser. No. 307,735 of Mar. 25, 1987; U.S. Pat. No. 4,947,348) a manual densitometer is described, which is equipped with such an automatic operating mode or function switch and is capable of automatically recognizing and distinguishing a limited set of control field types and of determining and displaying values characteristic of each individual control field type. The recognizable control field types include single color solid-tone fields, single color half-tone fields and two-color overprinted solid-tone fields. It is further automatically determined whether the instantaneous measurement is being carried out at an unprinted location of the sheet. The device determines in each measuring position the color density in all available measuring channels (usually red, blue, green and visual, corresponding to the ink densities of cyan, yellow, magenta and black) and determines by comparison with given color density reference values the type of the control fields involved, the color present, etc. The device then calculates the variable associated with the control field type and displays it. For the computation of certain complex variables such as, for example, the ink trap and dot area, additional measured values from other types of control fields, (e.g. solid-tone densities of the colors involved) are required. In such cases, the device indicates to the user by appropriate displays that other measurements must be carried out and displays the complex variables only after all necessary additional measurements have been carried out in proper sequence.

The densitometer described in EP-A-O 283 899 already offers a more simplified operation relative to devices not equipped with such an automatic functional switch, in that the user does not have to be concerned with the specific functional setting of the device for the control fields involved and is able to base more complex measurements on automatic user guidance. However, in view of the distinguishing criteria selected (comparison with given constant color density reference values) the reliable recognition of different types of color fields may be subject to problems, at least in certain extreme situations. Thus, for example, it is difficult to reliably distinguish solid-tone fields and half-tone fields over the full dot area range over the entire solid-tone range. The recognition of the colors of the control fields is also not optimal. Further, the device is not able to distinguish half-tone fields of different nominal dot area, such as those frequently used in the same print control strip.

Finally, in the case of half-tone fields, while the device displays the dot area, it is not able to determine and display the dot gain relative to the dot area values in the half-tone film, which is often desirable.

SUMMARY OF THE INVENTION

The present invention is intended to eliminate these shortcomings and to improve a densitometer of the aforementioned type in a manner such that the reliable recognition and distinction of the more usual print control field types becomes possible and the determination of complex variables which require several individual measurements in different control fields types is simplified and made more user friendly.

A densitometer according to a preferred embodiment of the invention which satisfies these requirements is, for example, characterized in that the color recognition device determines from color densities the relative variables of grayness and color hue errors and the color of the print color field from these relative variables.

Further, in a preferred embodiment, a type recognition device is provided which distinguishes and recognizes single color solid-tone fields, together with half-tone fields of at least two different nominal dot area, from stored or manually entered nominal dot area values and a stored typical dot area print characteristics.

In addition, a preferred embodiment of the invention is characterized in that the type recognition device distinguishes and recognizes single color solid-tone fields and single color half-tone fields by comparing a measured color density of the print color field or a dot area value calculated from the measured color density with a dot area limit value determined by the typical dot area print characteristic or a corresponding determined density limit.

BRIEF DESCRIPTION OF THE DRAWINGS

Other objects and advantages of the present invention will become more apparent from an exemplary embodiment of a densitometer according to the invention as described in the following detailed description with reference to the drawings, wherein like elements have been assigned like reference numerals and wherein.

DETAILED DESCRIPTION OF THE PREFERRED EMBODIMENTS

Figure 1:
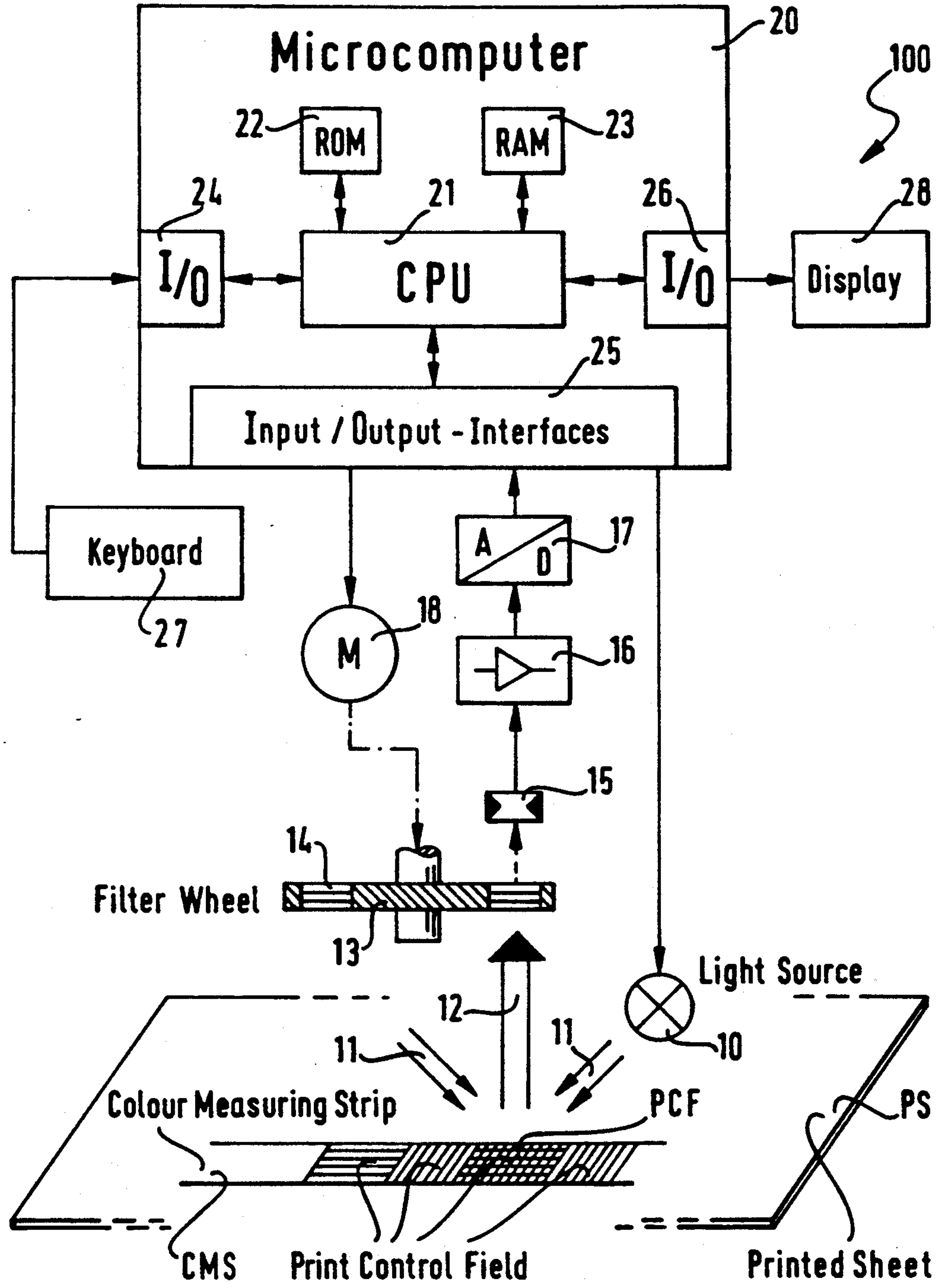
FIG. 1 shows a schematic view of the general configuration of an exemplary densitometer according to the invention.

FIG. 1 shows a printed sheet PS printed in an offset printing machine. In addition to the printed image itself, not shown, the printed sheet also includes a co-printed color measuring strip CMS with a series of print control fields (PCFs) of different types as described above. A print control field PCF to be analyzed is illuminated by a light 11 emanating from a light source 10 contained in an annular part, in the densitometer 100, at an angle of incidence of 45°±5°. The light 12 reflected by a print control field PCF at an angle of 0°±5°, (i.e., perpendicular to the plane of the printed sheet), arrives through one of four measuring filters 14 located in a filter wheel 13 at an electroptical receiver 15, which then produces a corresponding electrical analog signal. This is amplified in an amplifier 16, converted in an A/D converter 17 into a corresponding digital signal and passed to a microcomputer designated 20 as a whole. The latter has a conventional configuration and includes key components such as a central processing unit 21, a program memory 22, a working memory 23 and various input/output interfaces 24–26, whereby the microcomputer communicates with an operating keyboard 27 and a display unit 28 and is connected with the A/D converter 17, while also actuating the light source 10 and a drive motor 18 for the filter wheel 13.

Three of the four measuring filters 14 in the filter wheel are selectively permeable for red, blue and green lights, while the fourth filter 14 is a so-called visual filter adapted to the spectral sensitivity of the eye. In each measuring process all four filters are pivoted sequentially into the beam path, so that in every measuring process four digital measuring signals are produced, from which four corresponding color density values, correlated with the four colors of cyan, yellow, magenta and black of the printing inks usually employed, are computed in the microcomputer. These density values are the point of departure of all subsequent calculations and displays.

In keeping with its programing and the manually or automatically selected function, the microcomputer 20 uses these four color density values, or a plurality of them or in combination with color density values measured in one or several other print control fields, to calculate a certain value. The calculated value is then displayed, possibly together with suitable supplemental information, on the display unit 28.

To this extent the densitometer according to the invention corresponds generally to the known manual densitometers of the type designations such as D183, D185 or D186 of the Gretag Co. of Regensdorf, Switzerland. A general mechanical configuration of a densitometer according to a preferred embodiment therefore coincides with that of the known manual densitometers D183, D185 and D186 and is described in detail, for example, in U.S. Pat. No. 4,645,350 the disclosure of which is hereby incorporated by reference in its entirety. The densitometer system described in EP-A-O 283 899 has fundamentally the same electrical and mechanical configuration, so that no detailed explanation is necessary. In accordance with a preferred embodiment of the present invention, an automatic print control field recognition and function selection is provided, which is not present in these known manual densitometers.

Figure 2:
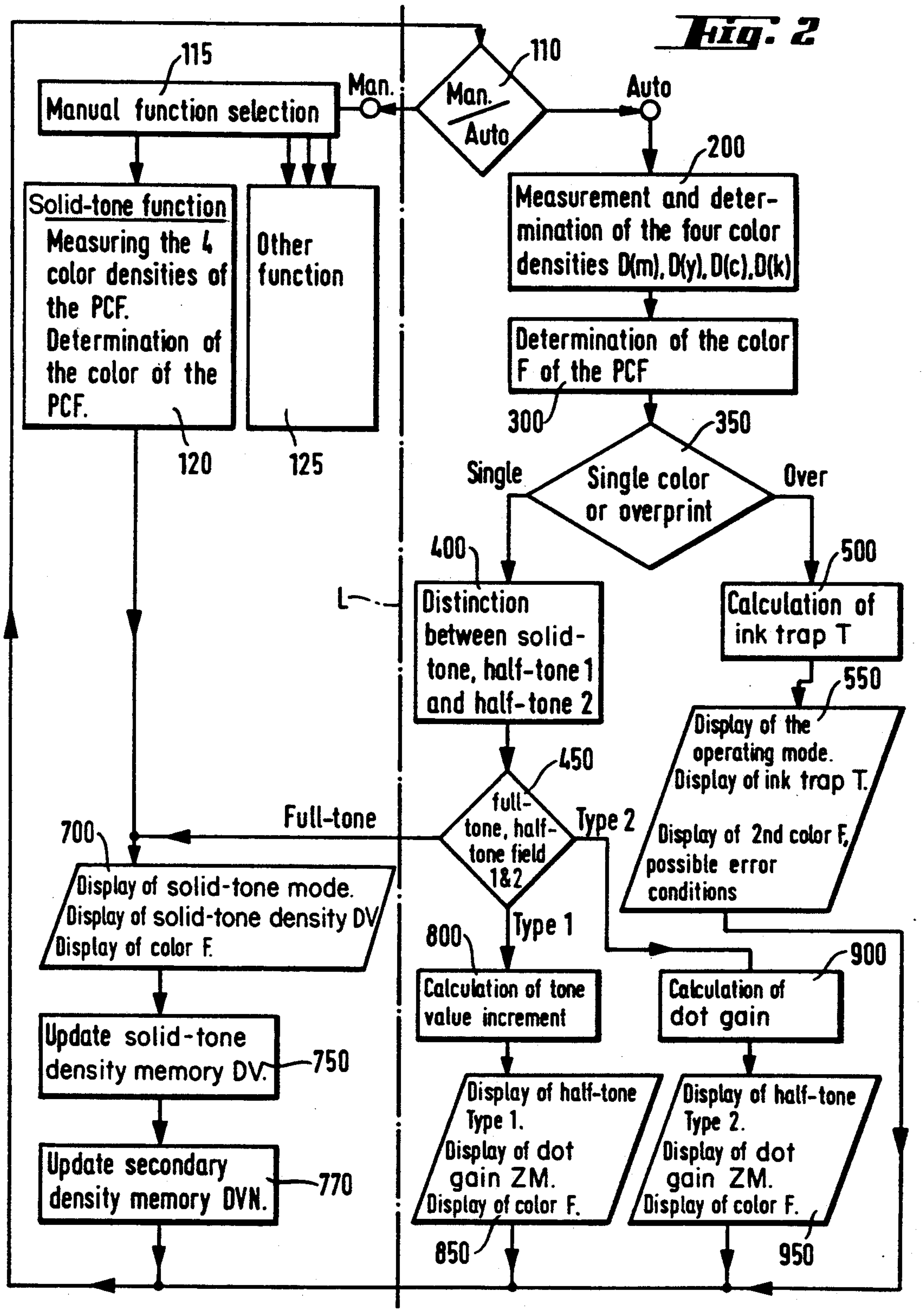
FIG. 2 shows a flow diagram of the key functions of the densitometer.

A fundamental mode of operation of an exemplary densitometer according to the invention is shown in the flow diagram of FIG. 2. The diagram essentially contains only the functional blocks and processes necessary for the understanding of a preferred embodiment of the invention and those that are novel or different relative to the state of the art. Secondary functions which are also present in the known densitometers, for example various initialization procedures, self-controls, etc., are for the sake of clarity not shown. All functions are controlled by the microcomputer 20, which stores a corresponding program in its program memory 22.

The following definitions are valid for the explanations presented hereinbelow:

| | | |
|---|---|---|
| K | black (single color) | |
| C | Cyan (single color) | |
| M | Magenta (single color) | |
| Y | Yellow (single color) | |
| R | Red (M + Y overprint) | |
| G | Green (C + Y overprint) | |
| B | Blue (C + M overprint) | |
| k | filter for black (transparent corresponding to the spectral eye sensitivity) | |
| c | filter for cyan (permeable for the red spectral range) | |
| m | filter for magenta (permeable for the green spectral range) | |
| Y | filter for yellow (permeable for the blue spectral range) | |
| f | auxiliary variable for filter; f = element of {c, m, y, k) | |
| D(k) | with the filter k | measured color density value on the instantaneous print control field |
| D(c) | with the filter c | |
| D(m) | with the filter m | |
| D(y) | with the filter y | |
| fl | auxiliary variable for the filter whereby in the instantaneous print control field the lowest of the three color density | |

-continued

| | |
|---|---|
| | vaues D(c), D(m) and D(y) were measured; f1 = c, m or y |
| f2 | same for the median color density value; f2 = c, m or y |
| f3 | same for the highest color density value; f3 = c, m or y |
| F | auxiliary variable for the color detected of the instantaneous print control field; F = element of {K, C, M, Y, R, B, G} |
| G | grayness of the printing ink |
| H | color hue error of the printing inks |
| MinDensity | constant to prevent division by zero (for example ≈0.01) |
| MinDifDensity | constant to prevent division by zero (for example ≈0.01) |
| G_limit | limiting value for grayness (for example ≈0.7), constant parameter |
| H_Limit | limiting value for color hue errors for (example ≈0.7) constant parameter |
| DV(k) | solid-tone density black |
| DV(c) | solid-tone density cyan |
| DV(m) | solid-tone density magenta |
| DV(y) | solid-tone density yellow |
| DVN(c,m) | to DV(c) measured secondary absorption density D(m) |
| DVN(c,y) | to DV(c) measured secondary absorption density D(y) |
| DVN(m,c) | to DV(m) measured secondary absorption density D(c) |
| DVN(m,y) | to DV(m) measured secondary absorption density D(y) |
| DVN(y,c) | to DV(y) measured secondary absorption density D(c) |
| DVN(y,m) | to DV(y) measured secondary absorption density D(m) |
| x | variable for first down ink |
| z | variable for second down ink |
| T | ink trap of the second down ink on the first down ink |
| FF1 | nominal dot area for half-tone type 1 with lower dot area |
| FF2 | nominal dot area for half-tone type 2 with higher dot area |
| FF3 | nominal dot area for solid-tone field (= 100%) |
| FFR_V | nominal dot area limit value to distinguish between half-tone and solid-tone fields |
| FM | dot area of a half-tone field |
| FS | dot area of an arbitrary print control field generally |
| DR | measured half-tone density generally, i.e., color density value measured on a half-tone field |
| DV | measured solid-tone field density generally, i.e., the color density value measured on a full-tone field |
| FF | dot area of the film half-tone field |
| ZM | dot gain ZM = FM − FF |
| ZT | typical dot gain as a function of FF (dot gain characteristic) |
| FT | typical dot area in print as a function of FF (dot area characteristic; FT = FF + ZT) |
| ZT50 | typical dot gain for FF = 50% (empirical value) |
| FT1 | typical dot area for FF1 (determined from FT) |
| FT2 | typical dot gain for FF2 (determined from FT) |
| FT3 | typical dot area for FF3 (= 100%) |
| FTR_V | typical dot area for FFR_V (determined from FT) |
| FG1_2 | calculated dot area limit for the distinction of half-tone fields of Type 1 and 2; FG1_2 = for example (FT1 + FT2)/2 |
| FG2_V | calculated dot area limit to distinguish half-tone fields of Type 2 from full-tone fields; FG2_V = for example (FT2 + 100%)/2 |
| FGR_V | calculated dot area limit to distinguish half-tone fields from full-tone fields |
| DRT1 | typical half-tone density for FT1 and FF1 |
| DRT2 | typical half-tone density for FT2 and FF2 |
| DRT3 | typical half-tone density for FF3 and FF3 |
| DG1_2 | calculated density limit to distinguish half-tone fields of Type 1 from Type 2 |
| DG2_V | calculated density limit to distinguish half-tone fields of Type 2 from solid-tone fields |
| DGR_V | calculated density limit to distinguish half-tone fields from solid-tone fields |

The various functional processes of the densitometer according to the invention are grouped in two principal program branches, i.e., "manual function selection" and "automatic function selection". In FIG. 2 the two program branches are separated by a dot-and-dash line L, with the program branch to the left of the line L corresponding to "manual function selection". This program branch contains functional and measuring possibilities, such as those already provided in the known manual densitometers, for example the aforementioned types D183, D185 and D186 of the Gretag Co., Regensdorf, Switzerland. For example, these possibilities include the determination of the solid-tone density of solid-tone fields, determination of the dot area and/or the dot gain of half-tone fields, determination of the ink trap of overprinted solid-tone fields, automatic color recognition, etc. As a representation of all of these measuring functions, here only the function of the "solid-tone density" is shown by the block 120. The other measuring functions are symbolically indicated by the block 125. The manually selected measuring functions are essentially immaterial for an understanding of the present invention and require no detailed explanation.

The branch program for "Manual Function Selection" or the branch program for "Automatic Function Selection" is selected by the operator via the keyboard 27 (branching block 110). In the case of "Manual Function Selection", the user then selects (branching block 115) the measuring function desired by the keyboard 27 and the corresponding function program is actuated.

When the operator has selected the program branch "Automatic Function Selection", the program steps shown in FIG. 2 to the right of the line L are executed.

First, when the densitometer is positioned on a print control field PCF to be analyzed and the measuring process actuated, the four color density values D(k), D(c), D(m) and D(y) of the print control field are determined and stored in memory for further computing steps (Function block 200). This takes place in exactly the same manner as in the program branch "Manual Function Selection" or in the known densitometers, so that no detailed explanation is necessary.

Subsequently, the color F of the print control field is determined from the density values (Function block 300). The color is determined in a manner similar to that of the known densitometers D183, D185 and D186 or in the "Manual Function Selection" program branch, but with the exception that in addition to the colors C, Y, M and K detectable in the aforementioned densitometers, the overprint colors R, B and G may also be detected. Details of the process are desired hereinbelow.

In the next branching block 350 the determination is made, based on the color F detected, of whether the print control field PCF is a single color field (sold-tone or half-tone field, F=C, M, Y or K), or an overprint field (two-color overprint field, F=R, G or B) and the process branched to the program block 400 or 500.

If an overprint situation is present (overprint field), in the program block 500, in a manner to be described in detail later, the ink trap T of the second down ink z on the first down ink x is calculated and then in the program block 550, via the display unit 28, the calculated ink trap T, the color z of the second don ink together with the information that at this instant the densitometer is in the (automatically selected) "ink trap" operating mode, are displayed and in case of an error situation (explained later) a corresponding error indication issued.

The program then returns to its starting point (Block 200, or, if the user has switched to "Manual Function Selection", to Block 115) and is then ready for the next measurement.

If the print control field PCF has been identified as a single color field, a determination is made in program Block 400, if it is a full-tone field, a half-tone field of a programed or keyboard entered first nominal dot area FF1 (Type 1), or a second nominal dot area FF2 (Type 2). The distinction is made in contrast to the system of EP-A-O 283 899, not by a given constant density reference values, but according to a preferred embodiment, on the basis of dynamic dot area limit values FG1_2 and FG2_V or alternatively from density limits DG1_2 and DG2_V, calculated individually from additional measured values. Details of the program block are explained later.

In the branching Block 450 then, depending on the type of the print control field PCF determined, one of the program Blocks 700, 800 or 900 is actuated. The program blocks 800 and 900 and the subsequent Blocks 850 and 950 are functionally identical as they merely process different numerical values.

If the print control field PCF has been identified as a half-tone field of Type 1 (nominal film dot area FF1) or of Type 2 (nominal film dot area FF2), in the program Block 800 and 900 the prevailing dot gain ZM is calculated in a manner described below. The program Block 850 or 950 then causes the dot gain ZM and the color F of the print control measuring field to be displayed in display unit 28, together with an indication that the value displayed is the dot gain for a half-tone field of Type 1 or Type 2, wherein Type 1 or Type 2 is representative of the previously entered (or possibly preprogrammed) nominal film dot areas FF1 or FF2, i.e., for example 40% or 80%. Furthermore, in case of an error situation a corresponding error signal is emitted.

The program then returns as after the operating mode of "Ink trap determination", to the starting point and is ready for the next measurement.

In case of a print control field identified as a (single color) solid-tone field, the solid-tone density DV is displayed in the program block 700. That is, in this case, the color density value D(f) measured in the detected color F of the print control field and the color F itself are displayed, together with an indication that the value displayed is a solid-tone density and that the device therefore at this instant is in the "solid-tone density determination" operation mode.

Subsequently, in the program Block 750 a solid tone memory (reserved memory range in the working memory 23) is actuated by entering the solid-tone density DV(f) of the print control field PCF in the memory. For each of the four printing colors, C, M, Y, K a separate memory range (or in relation to software a corresponding variable) is available. Depending on the number of measurements of solid-tone fields of different color, this solid-tone memory will therefore contain for each color a corresponding solid-tone density which is continuously updated, such that the stored value is replaced during each measurement (of a solid-tone field of the corresponding color) by a new value. These intermediately stored solid-tone densities are needed, as will be explained later, for the determination of the dot gain ZM and the ink trap T in the program Blocks 800 or 900 and 500.

In a similar manner, in the program Block 770 a secondary density memory (or the corresponding variable) is updated. In this memory the secondary (solid-tone) densities of the prevailing solid-tone field, i.e., the color density values DVN measured for the two other chromatic colors of the solid tone field involved, are stored. For a solid-tone field, these are the values DVN(c,m) and DVN(c,y) and for a solid-tone field the values DVN(y,c) and DVN(y,m) (see the aforecited definitions). These values are also needed for the calculation of the ink trap T in the program Block 500.

The program Blocks 700, 750 and 770 are also actuated within the program branch "Manual Function Selection" if the (manual) "solid-tone measurement" has been selected. It is assured in this manner that the solid-tone density memory and the secondary density memory are frequently updated and that therefore in the practical operation of the densitometer the additional measured values required for the aforementioned functions of the automatic mode are practically always available. If as an exception (for example during the initial activation of the device) this should not be true, this condition is automatically detected in Blocks 500 and 800 or 900 and a corresponding error signal emitted.

Following the Block 770, the program, as described above, returns to its starting point and is ready for the analysis of another print control field PCF.

Figure 3A:
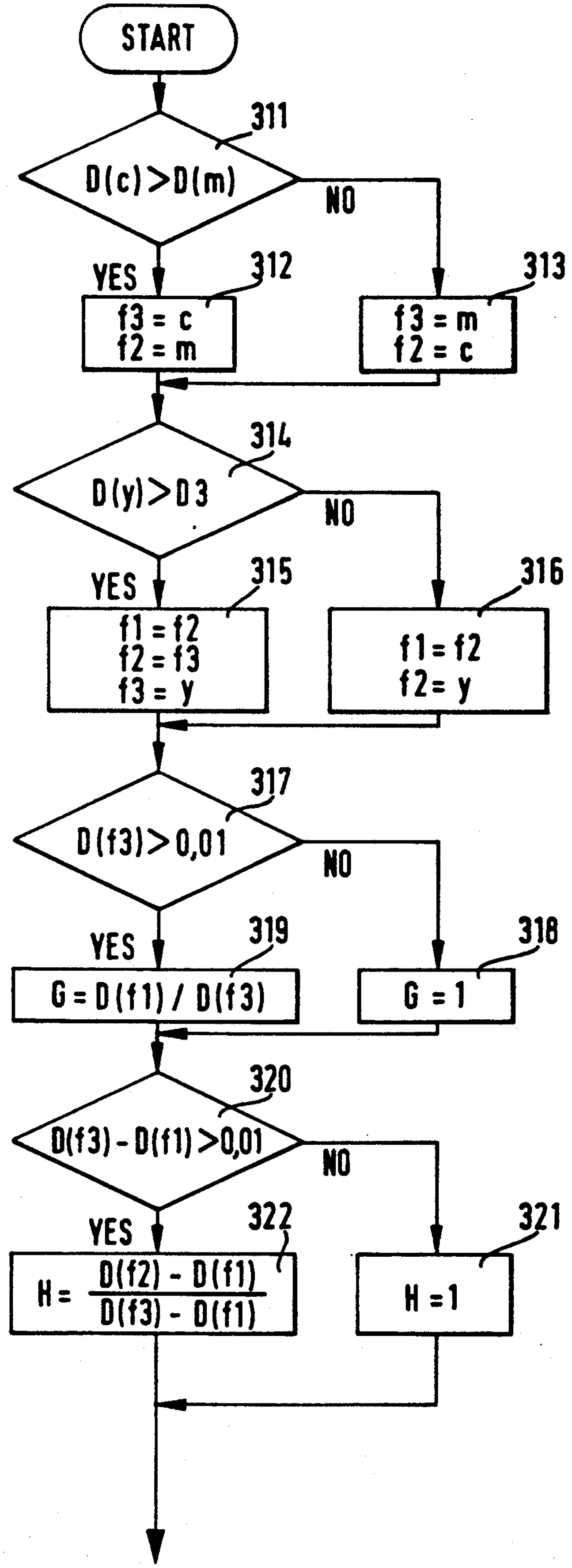
FIGS. 3*a* and 3*b* show a flow diagram of an exemplary "color recognition" functional block.
Figure 3B:
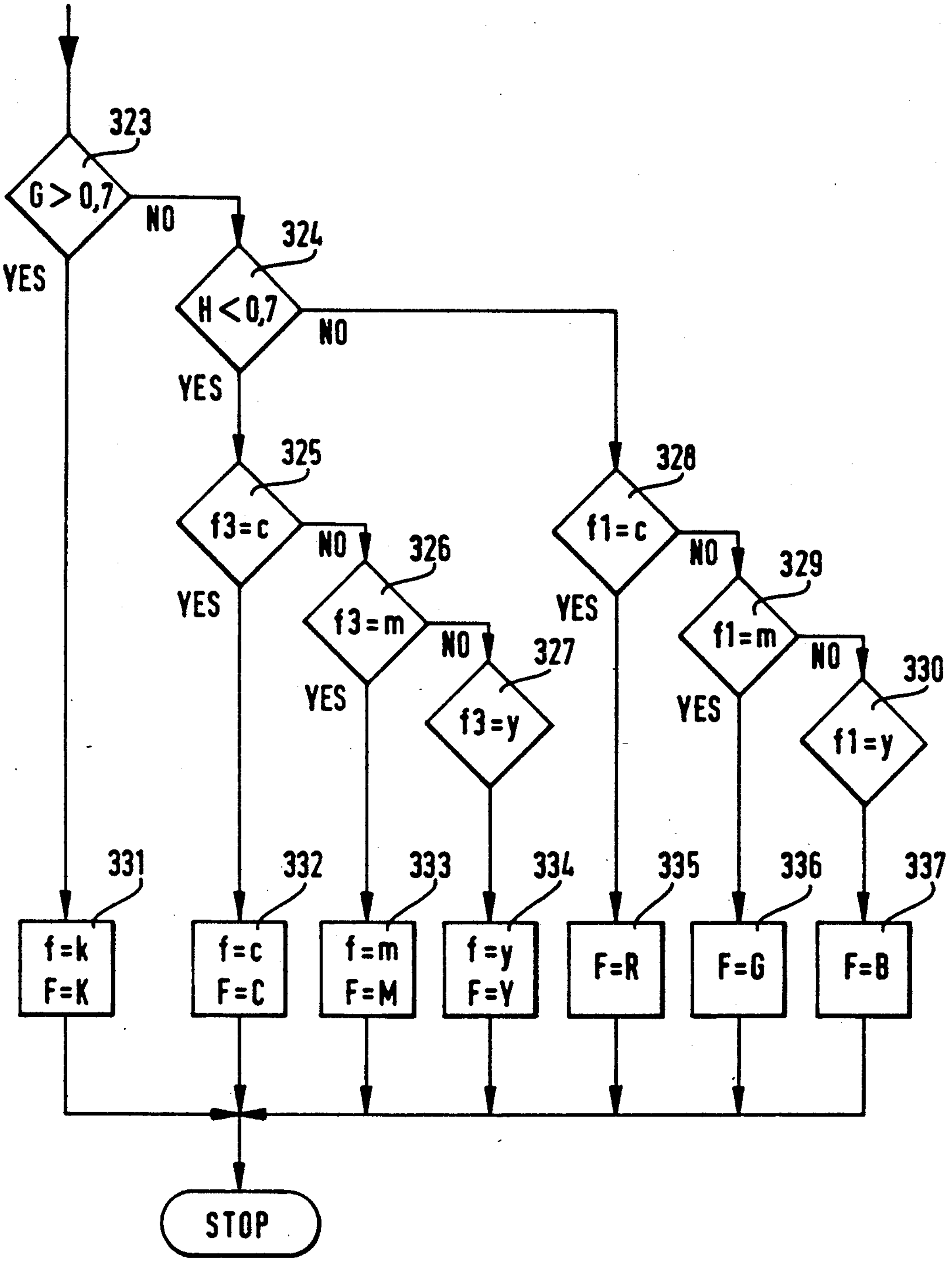

In FIGS. 3a and 3b the program Block 300 (Automatic Color Detection) is shown in more detail. Following the actuation of this block initially by a series of mutual comparisons of the color density values D(c), D(m) and D(y), a sorting by magnitude (Blocks 311–316) and then in Block 319 the computation of a so-called grayness G according to the formula G=D(f1)/D(f3) are carried out. If D(f3) is less than a predetermined minimum value (MinDensity), in order to avoid exceeding a numerical range (division by "zero") G is set equal to 0 (Blocks 317 and 318). Subsequently, in Block 322 the hue error H is calculated according to the formula H=[D(f2)−D(f1)]/[D(f3)−D(f1)], wherein again, in order to avoid exceeding a numerical range, H=1 if the divisor in this formula is less than a given minimum value (MinDensity') (Blocks 320 and 321).

The detection of color proper takes place in the subsequent Blocks 323–330 by a series of comparisons and queries relative to the previously determined grayness G and the hue error H, together with the result of the storing by magnitude of the values of f1, f2 and f3 present.

If the grayness G exceeds a predetermined threshold value G_Limit, typically about 0.7, the color of the print control field is evaluated as black (K). Otherwise, the hue error H is examined. If H is less than a given threshold value H_Limit, it is considered a single color. Otherwise, an overprint situation is considered to exist.

In the first case, the color F of the print control field is recognized as C, M or Y, depending on whether f3 was equal to c, m or y. In case of an overprint field the color F is recognized as R, G or B, depending on whether f1 was equal to c, m or y. In Blocks 331–337, the corresponding values are finally assigned to the variables F and f, thereby completing the automatic color recognition.

In contrast to the known system EP-A-O 238 899, automatic color recognition is assured not by comparison with given constant color density values, but exclusively by relative comparisons of measured color density values through the variables of grayness and hue error. In this manner, color recognition is assured over a much larger density range.

In a preferred embodiment of the present invention, automatic color recognition is carried in the same manner as in the case of the aforementioned manual densitometers D183, D185 and D186 of the Gretag Co. However, in accordance with a preferred embodiment, it is refined and extended as it also makes possible the recognition of the overprint colors R, B and G, which is not true in relation to the densitometers D183, D185 and D186. The latter recognize only the single colors C, M, Y and K.

Figure 4:
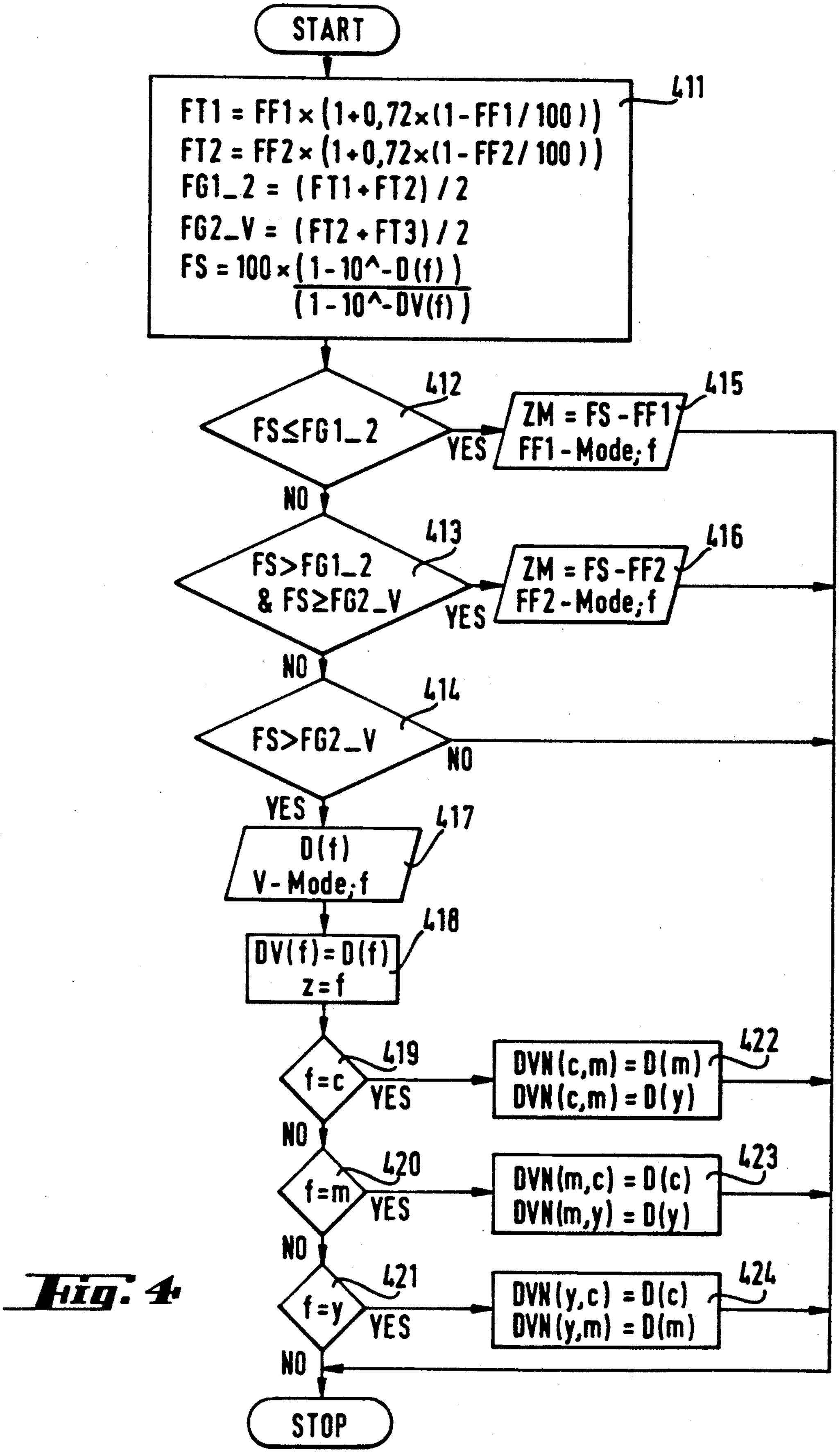
FIG. 4 shows a detailed flow diagram of an exemplary functional branch "automatic function selection"

FIG. 4 shows the program part of FIG. 2 comprising the program Blocks 400, 450, 700, 750, 770, 800, 850, 900 and 950 in more detail, wherein the individual program steps are compiled in a slightly different manner. In their summation, however, the aforementioned program blocks yield exactly the program process defined in FIG. 2.

If therefore on the basis of a recognized color F that the presence of a single color print control field has been determined. Initially, using the nominal film dot areas FF1 and FF2 entered through the keyboard and the preprogrammed typical dot gain function ZT, the two typical dot areas FT1 and FT2 are determined, and from them the two associated dot area limits FG1_2 and FG2_V, together with the dot area FS of the print control field related to the recognized color F are calculated (Block 411). The manner in which this takes place is described in more detail below.

Subsequently, by comparing the dot area FS with the two dot area limits FG1_2 and FG2_V it is decided whether a half-tone field of Type 1 (defined by the nominal film dot area FF1), a half-tone field of Type 2 (defined by the nominal film dot area FF2) or a solid-tone field (nominal film dot area 100%) is present (Blocks 412–414) and branching to the Blocks 415, 416 or 417 effected.

In the program Blocks 415 and 416, which essentially are identical with Blocks 800 and 850 or 900 and 950, the dot gain ZM is calculated relative to the prevailing half-tone field Type 1 or 2 in keeping with the relationships of ZM=FS−FF1 or ZM=FS−FF2 and then displayed together with the variables described in relation to FIG. 2.

In Block 417, which is identical with Block 700 in FIG. 2, the solid-tone density D(f) of the color F detected, the color F itself and the function mode are displayed as described relative to FIG. 2.

The subsequent program Block 418 carries out the updating of the solid-tone density memory in a manner similar to Block 750 in FIG. 2 and in Blocks 419–424, the secondary density memory is finally updated, as in Block 770.

The dot area FS of the print control field being analyzed is calculated in Block 411 by the following known equation [DIN (German Industry Standard) 16527]:

$$FS=100\cdot(1-10^{-D(f)})/(1-10^{-DV(f)})\,[\%]$$

wherein the individual variables have the significance defined above. As seen, in addition to the color density values D(f) of the recognized color F measured, the corresponding solid-tone density DV(f) is also required. The latter is available in the solid-tone density memory of the preceding measurements and is taken from it for the calculation. If the solid-tone density needed it not available, an error signal is issued to call the attention of the user to this fact.

The dot gain ZM of a half-tone field is defined as the difference between the actually measured (i.e., determined from the measured color density value and the associated solid-tone density calculated by the aforecited equation) dot area FM(=FS) and the nominal dot area FF corresponding to the prevailing half-tone field in the film; i.e., ZM=FM−FF1. The dot gain of a half-tone field of Type 1 is thus calculated as ZM=FS−FF1 and that of a half-tone field of Type 2 as ZM=FS−FF2, wherein FS is the actually determined dot area for the prevailing half-tone field.

Figure 5:
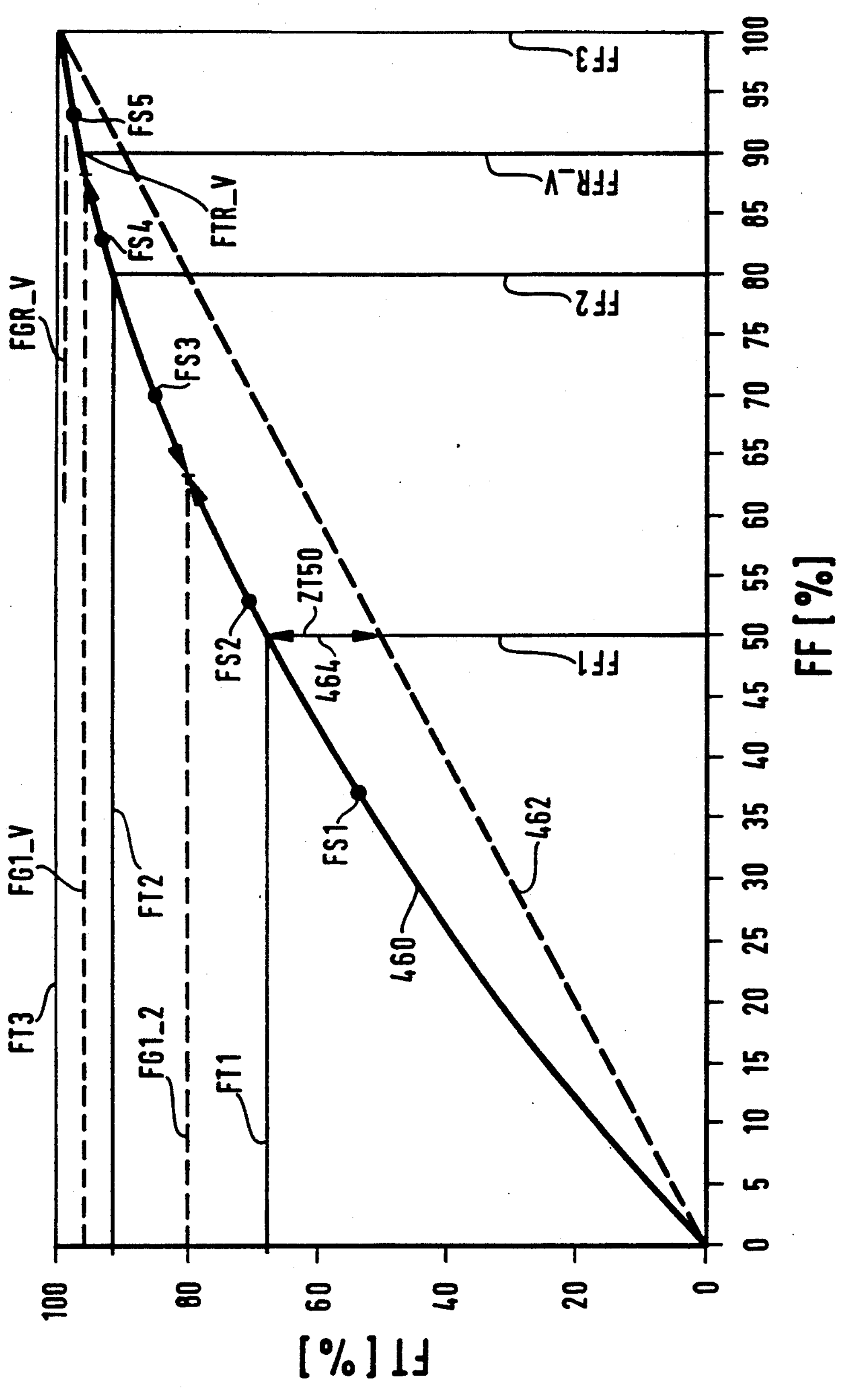
FIG. 5 shows a diagram to explain an exemplary computation of dot are limits.

In FIG. 5 the variation typical for offset printing of the dot area FT in the print (ordinate) is shown as a function of the dot area FF in the corresponding half-tone film (abscissa). The graph (solid line) 460 indicates the relationship between FT and FF and graph 462 (broken line) shows the relationship if FT would always be equal to FF for all FF. As seen, FT is located within a range of intermediate dot area (≈50%) clearly higher than the FF value in the film, while FT values within the range of smaller and larger surface coverages increasingly approached the FF value in the film and coincided with it at the two terminal values FF=0 and FF=100%. The rise of the graph 460 relative to 462, (i.e., FT-FF), is the typical tone value or dot gain ZT. The arrow 464 shows the typical dot gain ZT50, (i.e., the difference between the dot area typically measured in a print of a half-tone field, where the nominal dot area amounts to 50% in the film).

The typical dot gain ZT in the print as a function of the nominal dot area FF in the film may be represented approximately by the following quadratic function:

$$ZT=0.04\cdot ZT50\cdot(1-FF/100)\cdot FF \quad ZT, FF, ZT50 \text{ in } \%$$

For the typical dot area FT, correspondingly:

$$FT=FF\cdot(1+4\cdot ZT\cdot(1-FF/100)/100) \quad FT, FF, ZT50 \text{ in } \%$$

With ZT50=18%, this yields:

$$ZT=0.72\cdot FF\cdot(1-FF/100) \quad [\%]$$

$$FT=FF\cdot(1+0.72\cdot(FF/100) \quad [\%]$$

These typical functional relationships between FT and FF are stored in the program memory 22 of the microcomputer 20 and are used for the calculation of the dot area values FG1_2 and FG2_V or alternatively of the density limits DG1_2 and DG2_V.

In FIG. 5, two typical dot area values to be expected from the typical dot area FT are plotted for two nominal dot area values FF1 and FF2 selected as examples.

A nominal dot area FF1 corresponds to a half-tone Type 1 (here for example 50%), and a nominal dot area FF2 corresponds to that of a half-tone field Type 2 (here for example 80%). The nominal dot area FF3=100 defines a solid-tone field, and the associated typical dot areas is designated FT3. The nominal dot area FF1 and FF2 are given by the half-tone types present in the print control strip and must be entered in the densitometer by the keyboard.

In order to decide whether a print control field being analyzed is a solid-tone field or a half-tone field of Type 1 or Type 2, the relationship of the dot area FS determined by the measurement (Block 411) to the typical dot areas FT1, FT2 and FT3 is examined. For this purpose, two dot area limits FG1_2 and FG2_V are determined (block 411) and the dot area FS measured is compared with the dot area limits (Blocks 412–414). If FS is located below the first (lower) dot area limit FG1_2, the print control field is defined as a half-tone field of Type 1 (Block 412). If FS is located between the first and the second dot area limit, the print control field is considered as a half-tone field of Type 2 (Block 413). If FS is located above the second dot area limit FG2_V, the print control field is recognized a sa solid-tone field (Block 414). In FIG. 5, as examples, five measured dot area values FS1, FS2, FS3, FS4 and FS5 are entered. The first two values (FS1 and FS2) thus belong to a half-tone field of Type 1, the next two values to a half-tone field of Type 2 and the last value FS5 to a solid-tone field.

The two dot area limits FG1_2 and FG2_V are preferably laid out so that they are centrally located between the typical dot area values FT1 and FT2 or FT2 and FT3 corresponding to FF1 and FF2 or FF2 and FF3, (i.e., FG1_2 =(FT2−FT1)/2 and FG2_V=(FT3−FT2)/2). Obviously, other definitions of the limit coverages are also possible.

According to an essential aspect of the invention, the distinction between half-tone and solid-tone fields is effected not on the basis of measured color density values by direct comparison with fixed given reference color density values (statically), but dynamically by comparing the dot area limits with the dot area determined for the print control field involved, the computation of which also includes the solid-tone density of the recognized color of the print control field concerned. The prevailing solid-tone density is thus included in the distinguishing criteria and the distinction of the different types of print control fields become significantly more reliable. This is seen clearly in FIG. 6, which illustrates an alternative method for the distinguishing of solid-tone and half-tone fields, based on the same principles of the invention.

If the general defining equation for the surface coverage FM:

$$FM=100\cdot(1-10^{-DR})/(1-10^{-DV})\ [\%]$$

wherein DR is the measured (half-tone) color density and DV the corresponding solid-tone density, is resolved relative to half-tone color density, the following relationship is obtained:

$$DR=-\log(1-10^{-DV})\cdot FM/100)$$

With this equation, for any typical dot area FT, a corresponding typical half-tone density DRT may be calculated with the inclusion of the associated solid-tone density DV:

$$DRT=-\log(1-10^{-DV})\cdot FT/100)$$

This typical half-tone density is to be interpreted as the half-tone density value to be expected as the measured value on the basis of the typical relationship between dot area in the film and dot area in print, if the dot area of the corresponding print control field in the film has the value of FF and in print the corresponding value of FT. The formula therefore transforms the dot area space into a half-tone density space.

According to this formula the typical dot areas FT1 and FT2 belonging to the two nominal dot areas FF1 and FF2 may be recalculated into the two typical half-tone densities DRT1 and DRT2:

$$DRT1=-\log(1-(1-10^{-DV})\cdot FT1/100)$$

$$DRT2=-\log(1-(1-10^{-DV})\cdot FT2/100)$$

Correspondingly, the two density limits DG1_2 and DG2_V are obtained from the two dot area limits FG1_2 and FG2_V as:

$$DG1\_2=-\log(1-(1-10^{-DV})\cdot FG1\_2/100)$$

$$DG2\_V=-\log(1-(1-10^{-DV})\cdot FG2\_V/100)$$

Figure 8:
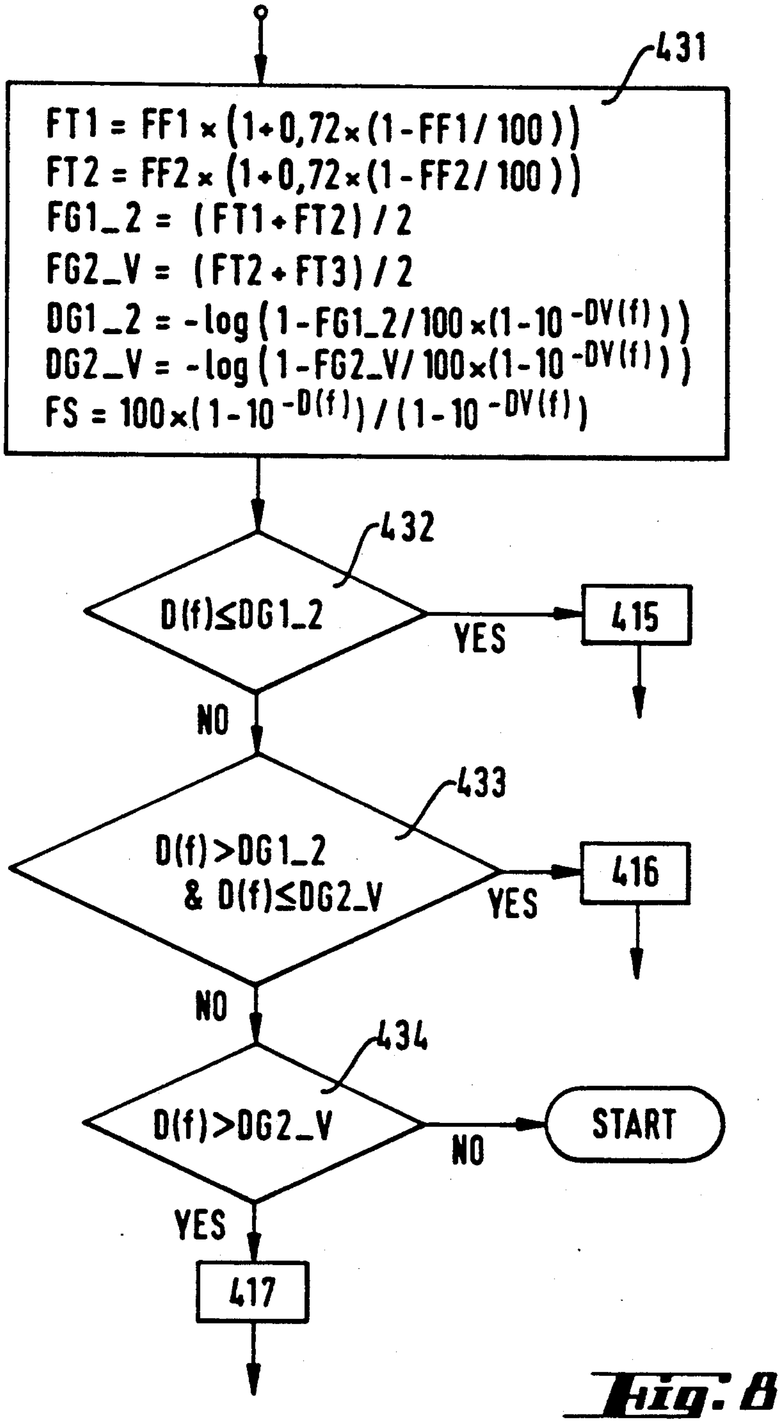
FIG. 8 shows a detailed variant of the flow diagram of FIG. 4.

According to FIG. 8 these two density limits, which contain the solid-tone densities and which therefore are dynamic values, may be employed to distinguish between solid-tone and half-tone fields. The program Blocks 431 to 434 directly replace the corresponding Blocks 411–414 in FIG. 4.

In Block 431, the two density limits DG1_2 and DG2_V are calculated from the nominal dot area FF1 and FF2 based on the typical relationship between the nominal dot area and the dot area to be measured in the print, and with the inclusion of the instantaneous solid-tone density contained in the solid-tone memory and corresponding to the recognized color of the print control fields. From the measured color density value and the associated solid-tone density, the dot area FS of the print control field is further determined. In Blocks 432–434, a classification similar to the Blocks 412–414 is carried out. In the process, the print control field is defined as a half-tone field of Type 1, half-tone field of Type 2 or solid-tone field, depending on whether the color density value measured for the color detected (i.e., the corresponding half-tone density) is located below the first density limit, between the two density limits or above the second density limit. Subsequently, there is branching to thee Blocks 415, 416 or 417, or else the process is returned to the starting point of the program according to FIG. 4.

Figure 6:
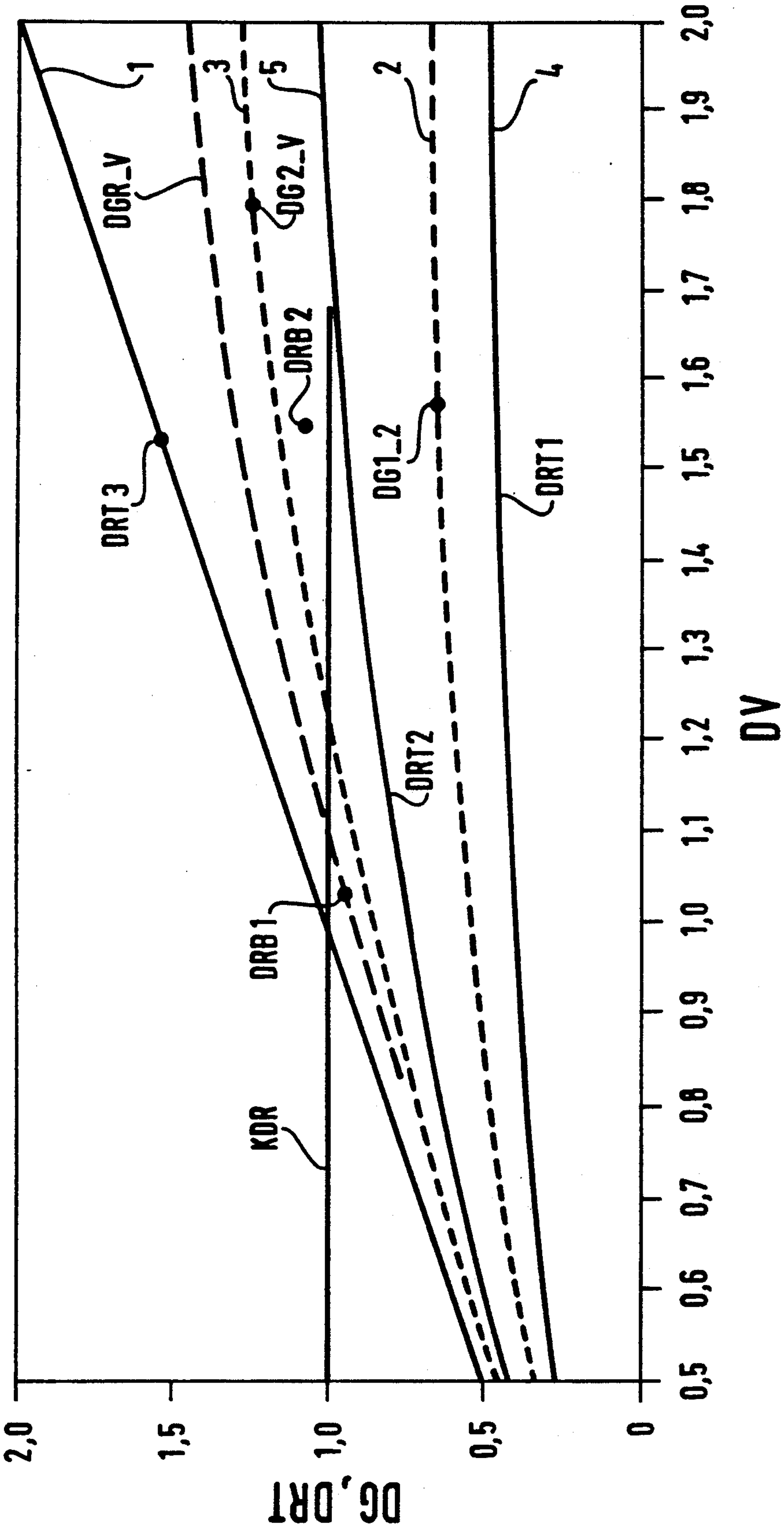
FIG. 6 shows a diagram to explain an exemplary computation of density limits.

FIG. 6 shows how the density limits DG1_2 and DG2_V and the typical half-tone densities DRT1 and DRT2 and DRT3 vary as a function of the solid-tone density DV over their characteristic variation range determined by the physical layer thickness variation of the printing ink involved. (Type typical half-tone density DRT3 is that of a nominal 100% half-tone field, i.e., of solid tone field). The illustration is based on an example assumed above for FF1=50%, FF2=80% and ZT50=18% or FT1=68%, FT2=91.5%, FG1_2=79.8% and FG2_V=95.8%.

As seen in the figure, the curves in particular for higher nominal dot areas (DRT3, DG2_V, DRT2, DG1_2) show an appreciable rise, (i.e., the density limits DG1_2 and DG2_V determining the type of print control fields are different for every value of the solid-tone density). If, as in the case of the system of EP-A-O 283 899, a given constant density reference value would be used as the distinguishing criterion, different results would be obtained, depending on the instantaneous solid-tone value and especially in the case of low values of said density. To illustrate this problem, in FIG. 6 an example of a constant density reference value KDR is entered. As seen, it is in agreement for the solid-tone density value of 1.2 with the density limit DG2_V according to the invention. But a print control field with a half-tone density DRB1 measured as an example at an associated solid-tone density of $\approx 1.0$ would already be defined as a half-tone field, whereas in an exemplary preferred process of the invention, it would still be recognized as solid-tone field. Inversely, a print control field with a half-tone density DRB2 measured for example at an associated solid-tone density of $\approx 1.5$ would be typically classified as a solid-tone field, while according to the exemplary preferred embodiment of the invention it would be recognized as a half-tone field of Type 2. Constant density reference values therefore are suitable as distinguishing criteria at the most within a defined, relatively narrow solid-tone density value range.

Figure 9:
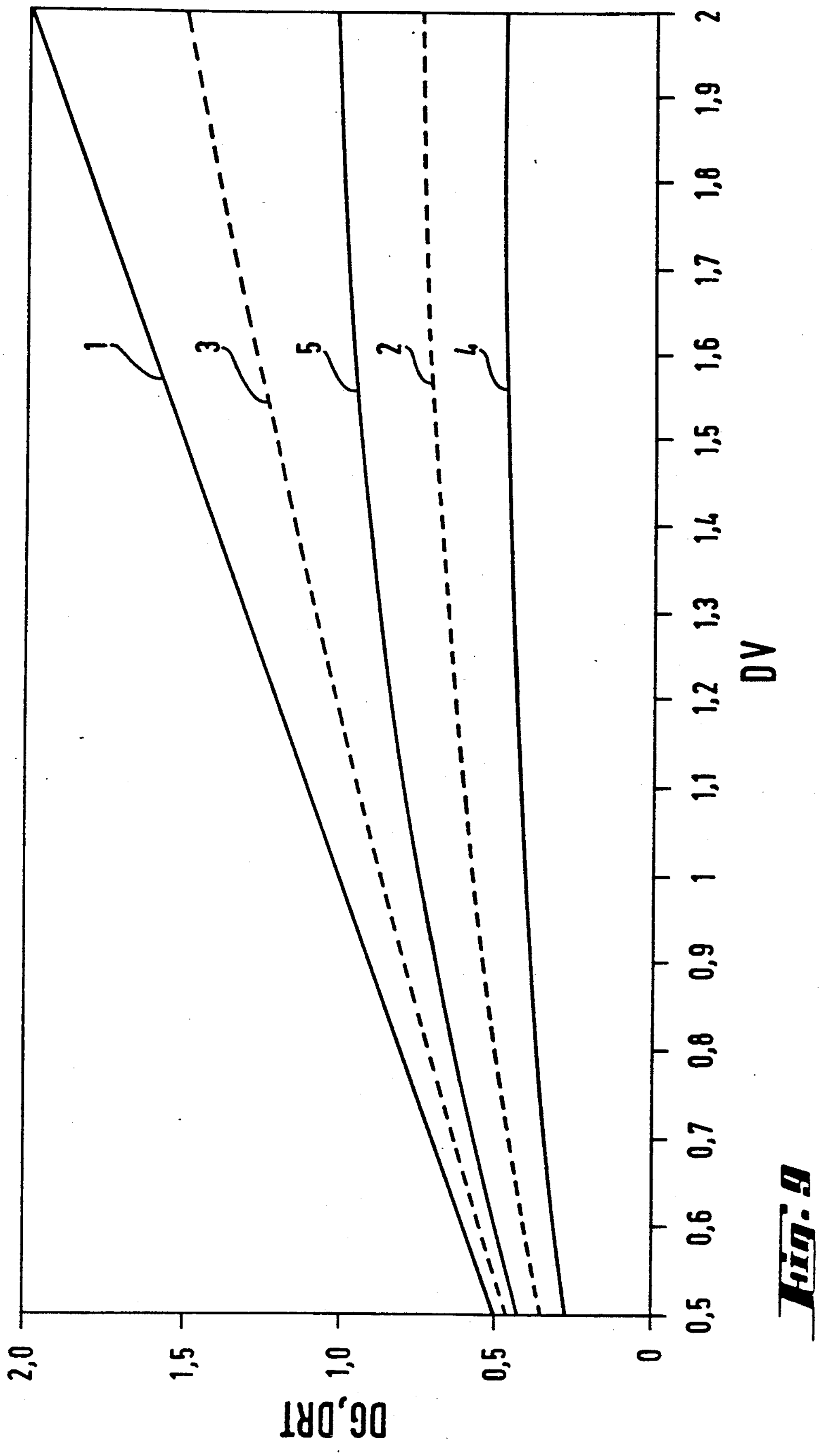
FIG. 9 shows another diagram for an explanation of the determination of density limits.

As mentioned above, the dot area limits FG1_2 and FG2_V or the density limits DG1_2 and DG2_V may also be placed differently than as described relative to FIGS. 5 and 6. According to FIG. 9, which illustrates together with FIG. 6 the relationship between the solid-tone density DV and the typical half-tone density DRT or the density limit DG, the two density limits DG1_2 and DG2_V are located so that they divide the bands defined by the two typical half-tone densities DRT1 and DRT2 and DRT2 and DRT3 in the center; i.e., the following is valid:

$$DG1\_2=(DRT1+DRT2)/2$$

$$DG2\_V=(DRT2+DRT3)/2$$

DRT1 and DRT2 are calculated as described above from the nominal dot areas FT1 and FT2 and the associated solid-tone density DV. DRT3 is by definition 100%. Solid-tone fields and half-tone fields are again distinguished by the exemplary process diagram shown in FIG. 8, wherein merely Block 431 is correspondingly modified.

According to the description set forth above, a densitometer of the invention distinguishes between solid-tone fields and two types of half-tone fields. It is obvious that in exactly the same manner several other types of half-tone fields with different nominal surface coverages may also be recognized. It is merely necessary to define or correspondingly calculate more dot area limits or density limits by the same criteria and compare the measured dot areas or half-tone densities with them in a similar manner. Inversely, it is also possible to restrict the process to a single half-tone field or to a distinction between a solid-tone and a half-tone field. For example, as shown in FIG. 5, the procedure may be based on a nominal dot area in the field of FFR_V=90% corresponding to a typical dot area in the print of FTR_V$\approx$95% and a dot area limit FGR_V set so that FGR_V=(FGR_V+FT3)/2. A print control field PCF is considered solid-tone field if the measured dot area FS is above the surface limit FGR_V. Otherwise it is classified as a half-tone field without reference to a given nominal dot area (In this case it is obviously not necessary to enter a given nominal dot area). In this simplified embodiment of the densitometer, which naturally may also be effected in the form of an additional operating mode, it is convenient in the case of a print control field identified as a half-tone field to display in place of the dot gain, the measured dot area FS and an indication of this fact. The necessary modifications of the program are trivial and require no further explanation.

Obviously, it is also possible in the aforementioned exemplary embodiment to carry out the distinction between solid-tone fields and half-tone fields instead of a dot area limit FGR_V, by a corresponding density limit DGR_V, as shown in FIG. 6. The density limit DGR_V is calculated in a manner similar to the other density limits DG1_2 and DG2_V, from the dot area limit FGR_V.

Figure 7:
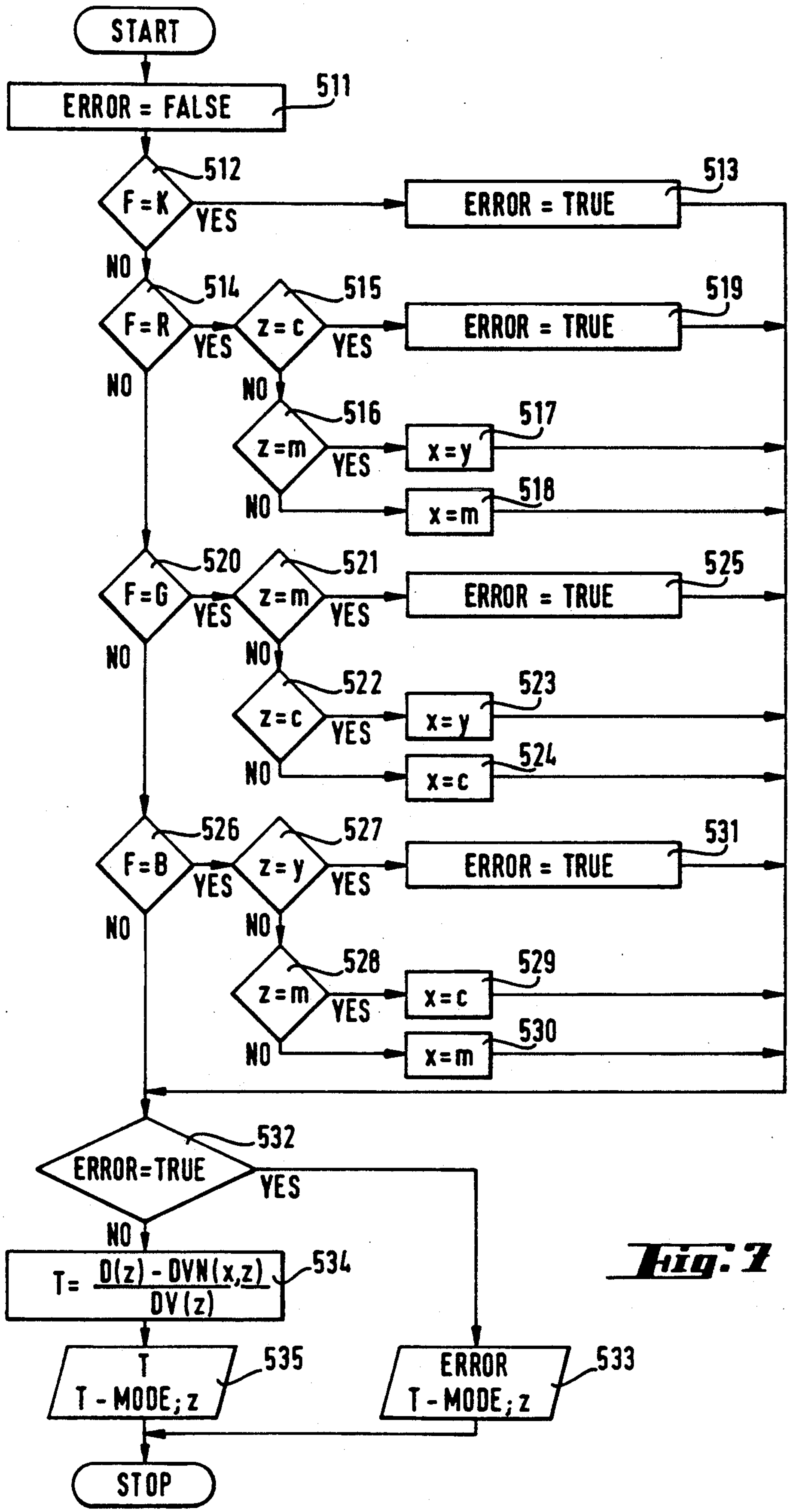
FIG. 7 shows a detailed flow diagram of an exemplary "ink trap" functional block.

In FIG. 7, the Blocks 500 and 550 shown in FIG. 2, in which the calculation and display of the ink trap T is carried out in an overprint situation, are broken down into more detail.

In Blocks 511–513, an error variable is analyzed and in case the color detected is black, the error variable set. In Block 514 it is examined whether the color recognized is red. In the positive case, the color of the second down ink z involved is determined (Blocks 515, 516) and the color of the first down ink x involved determined (Blocks 517, 518) or the error variable (Block 519) set again.

In Block 520 it is examined whether the color recognized is green and the second down ink z (Blocks 521, 522) and the first down ink x (Blocks 523, 524) determined in an analogous manner, or the error variable (Block 525) entered.

In exactly the same manner, it is examined in Block 526 whether the color detected is blue and then the second down ink z (Blocks 527, 528) and the first down ink x (Blocks 529, 530) determined or the error variable entered (Block 531).

In Block 532 the error variable is queried. If it is set, (i.e., if an error situation exists), a corresponding error signal is displayed on the display unit 28 (Block 533). Otherwise, in Block 534 the ink trap T is calculated in keeping with the known relationship (DIN 16527):

$$T=(D(z)-DVN(x,z)/DV(Z)$$

and displayed in Block 535 by the display unit 28, together with the color of the second down ink z involved. In the aforementioned formula, D(z) is the measured color density value measured with the measuring filter corresponding to the second down ink (i.e., in case of an overprint, of, for example, yellow on magenta, the measured yellow density), DV(z) the solid-tone density corresponding to the second down ink involved and contained in the solid-tone memory, and DVN(x,z) the secondary absorption density corresponding to the two colors involved, which is also available in the secondary density memory from earlier measurements of solid-tone fields.

The determination of the color of the second down ink printed over the first ink is based on the (arbitrary) convention that the second color z is the one the solid-tone density of which is most up-to-date, i.e., the color of the last or more recently measured solid-tone field. This convention corresponds to the proven measuring sequence used in the known densitometers D183, D185 and D186 for the manual detection of ink acceptance. Naturally, other schemes are also possible.

In the following, exemplary program blocks or functional operations shown in FIGS. 2, 3, 4 and 7 are summarized in exemplary program listings formulated in the programming language "PASCAL". The program is entered in a suitably compiled form in the program memory 22 of the microcomputer 20. (Texts in {−} are explanation comments).

```
{Program for automatic color recognition (Flow Diagram
FIG. 3)}
IF D[c] > D[m] THEN BEGIN
    f3 := c;
    f2 := m
      ELSE BEGIN
          f3 := m;
          f2 := c;
      END;
END;
IF D[y] > D[f3] THEN BEGIN
      f1 := f2;
      f2 := f3;
      f3 := y
      ELSE BEGIN
        IF D[y]>D[f2] THEN BEGIN
        f1 := f2;
        f2 := y;
      ELSE f1 := y;
 END;
END;
IF D[f3] > MinDensity THEN G: = D[f1]/D[f3]
ELSE G := 1;
If (D[f3] − D[f1]) > MinDensity' THEN
    H := (D[f2] - D[f1])/(D[f3] - D[f1])
ELSE H := 1;
IF G > G_Limit THEN BEGIN
    F := K;
    f := k;
END
ELSE BEGIN
IF H <_Limit THEN BEGIN
    IF f3 = c THEN BEGIN
      F := C;
      f := c;
 END;
 IF f3 =m THEN BEGIN
    F := M;
    f := m;
 END
 IF f3 = y THEN BEGIN
    F := Y;
    f := y;
    END;
 END
 ELSE BEGIN
    IF f1 = c THEN F := R;
    IF f1 = m THEN F := G;
    IF f1 = y THEN F := B;
 END;
END
{(Program for automatic field recognition (Flow Diagram
FIG.4)}
IF (F=K) OR (F=C) OR (F=M) OR (F=Y) THEN BEGIN
{Calculation of limit values}
FT1 = FF1 * (1 + 0.72* (1-FF1/100%));
FT2 = FF2 * (1 + 0.72* (1-FF2/100%));
FG1_2 = (FT1 + FT2)/2;
FG2_V = (FT2 + FT3)/2;
{Calculation of measuring field surface coverage}
FS := 100 * (1 − 10   +D[f])(1−10   −DV[f]);
(Mode selection)
IF FS <=FG1_2 THEN BEGIN
    ZM := FS − FF1;
    Display(FF1_Mode, ZM,f);
END;
```

-continued

```
IF (FS > FG1_2) AND (FS<=FG2_THEN BEGIN
    ZM := FS − FF2;
    Display(FF2_Mode, ZM,f);
END;
IF FS > FG2_V THEN BEGIN
    Display(V_Mode, D[f],f);
{Preparation of color selection and the calculation of
the ink trap of further measurements}
DV[f] :=D[f];
z :=f;
IF f=c THEN BEGIN
 DVN[c,m] := D[m];
 DVN[c,y] := D[y];
 END;
 IF f=m THEN BEGIN
    DVN[m,c] := D[c];
    DVN[m,y] := D[y];
 END;
IF f=y THEN Begin
    DVN[y,c] := D[c];
    DVN[y,m] := D[m];
 END;
END
ELSE (Calculation of ink trap)
{Program for the calculation of ink trap (Flow
Diagram: FIG. 7)}
BEGIN
 ERROR := FALSE;
 {Black is not involved in overprint fields}
IF (z=k) THEN ERROR := TRUE
ELSE BEGIN
    {If red measuring field}
    IF (F=R) THEN BEGIN
            {Cyan is not involved in the red measuring
field}
            IF (z=c) THEN ERROR := TRUE
            {If 2nd printed color = M, then 1st printed
color = Y, otherwise reversed}
            ELSE IF (z=m) THEN x := y ElSE x :=m;
    END;
    {If green measuring field}
    IF (F=G) THEN BEGIN
            {Magenta is not involved in green field}
            IF (z=m) THEN ERROR := TRUE;
            {If 2nd printed color = C, then first
printed color = Y, otherwise reversed}
            ELSE IF (z=c) THEN x := y ELSE x := c;
    END;
    {If blue measuring field}
    IF (F=B) THEN BEGIN
            {Yellow is not involved in blue measuring
field)
            IF (z=y) THEN ERROR := TRUE
            {If 2nd printed color = M, then 1st printed
    color = C, otherwise reversed}
            ELSE IF (z=m) THEN x := c ELSE x :=m;
    END;
    IF ERROR THEN Display(T_Mode, ERROR,z)
    ELSE BEGIN
            {Calculation of ink acceptance}
            T :=(D[z] − DVN{x,z])/DV[z];
            Display(T_Mode, T,z);
            END;
    END;
END;
```

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and scope of equivalents thereof are intended to be embraced therein.

In the foregoing description, in the claims and in the drawings the terms listed in the left column of the following table are used in the meaning of the terms of the right column of this table:

| Used term | Synonymous term |
|---|---|
| full-tone | solid-tone, solid |
| surface coverage, surface area coverage | dot area, dot area coverage |
| tone value increment, point increment | dot gain |
| ink acceptance | ink trap |
| blackening | grayness |
| color tone | hue |
| first printed ink | (first) down ink |
| second printed ink | second down ink |

What is claimed is:

1. Apparatus for the analysis of print control fields, comprising:

an electro-optical measuring device to determine a set of color densities of a print control field;

a color recognition device to determine relative variables of grayness and color hue errors from said set of color densities, and to determine a color of the print control field from said relative variables;

a type recognition device to determine print control field type from the set of color densities as one of a given set of print control field types;

a measured value determination device to determine a measuring variable correlated with the type and the color of the print control field; and, a display unit to display the measuring variable, the color of the print control field and user guide indications.

2. Apparatus according to claim 1 further comprising means for storing and manually entering nominal dot area values and a stored typical dot area characteristic, such that the type recognition device distinguishes and recognizes single color solid tone fields and half-tone fields, together with half-tone fields of at least two different nominal dot areas, from said stored or manually entered nominal dot area values and a stored typical dot area characteristic.

3. Apparatus according to claim 2 further comprising a solid-tone memory for storing every color density of the set of color densities, solid-tone densities of single color solid-tone fields of the color being intermediately stored and up-dated during each new measurement of a single color solid-tone field.

4. Apparatus for the analysis of print control fields, comprising:

an electro-optical measuring device to determine a set of color densities of a print control field;

a color recognition device to determine the color of the print control field from the set of color densities;

a type recognition device for recognizing and distinguishing single color solid-tone fields and half-tone fields, together with half-tone fields of at least two different nominal dot areas, from stored or manually entered nominal dot area values and a stored typical dot area characteristic, said type recognition device further determining print control field type from the color densities as one of a given set of print control field types;

a measured value determination device to determine a measuring variable correlated with the type and the color of the print control field from the set of color densities; and, a display unit to display the correlated measuring variable, the color of the print control field and user guide indications.

5. Apparatus according to claim 4, further comprising a solid-tone memory for storing every color density of the set of color densities, solid-tone densities of single color solid-tone fields of the color being intermediately stored and up-dated during each new measurement of a single color solid-tone field.

6. Apparatus according to claim 4, wherein said type recognition device distinguishes and recognizes single color solid-tone fields and single color half-tone fields by comparing a measured color density of the print control field or a dot area value calculated from the measured color density with a dot area limit value determined from the typical dot area characteristic or a corresponding density limit.

7. Apparatus according to claim 5, further comprising a secondary density memory for every non-black color density of the set of color densities, such that two prevailing secondary absorption densities of single color solid-tone fields of the color are stored intermediately and updated during each new measurement of a single color solid tone field.

8. Apparatus according to claim 7, wherein said measuring variable determination device further calculates ink trap as a measured variable when said color recognition device detects a two-color overprinted print control field based on the color of the print control field, and said measuring variable determination device takes the solid-tone densities and secondary absorption densities of the solid-tone fields correlated with printing inks involved in the two-color overprint field from the solid-tone memory and the secondary memory.

9. Apparatus according to claim 8, further comprising dot area calculating means for determining dot area values for each of the print control fields recognized as a single color measuring field, and said type recognition device further compares each of said dot area values with dot area limit values determined by said nominal dot area values and said stored typical dot area characteristic, a result of said comparison being input to said type recognition device to recognize each print control field as a single color solid-tone field or a single color half-tone field.

10. Apparatus according to claim 9, wherein the dot area limit values are approximately centrally located between the dot area values obtained from the nominal dot area values for the half-tone fields and the solid-tone fields, and the stored typical dot area characteristic.

11. Apparatus according to claim 10, wherein the type recognition device distinguishes and recognizes single color solid-tone fields and single color half-tone fields by comparing measured color density of the print color field with color density limits, said density limits being determined by the nominal dot area values and the stored typical dot area characteristic.

12. Apparatus according to claim 11, wherein the dot area calculating means calculates the dot area of the print control field by utilizing an instantaneous solid-tone density for a solid-tone field of the color, said instantaneous solid-tone density being intermediately stored in the solid-tone density memory.

13. Apparatus according to claim 12, wherein the type recognition device determines said dot area limit values from the nominal dot area values and the stored typical dot area characteristic, together with the instantaneous solid-tone density of a solid-tone field of the color intermediately stored in the full-tone memory, and further determines said density limits from said dot area limit values.

14. Apparatus according to claim 12, wherein the type recognition devices determines typical half-tone densities in a print from the nominal dot area values and the stored typical dot area characteristic, together with the instantaneous solid-tone density of a solid-tone field of the color intermediately stored in the solid-tone memory, and further determines said density limits from said typical half-tone densities.

15. Apparatus according to claim 14, wherein said density limits are established such that DRT1<DG1_2 <DRT2<DG2_V<DRT3 wherein DG1_2 and DG2_V are first and second density limits, respectively, and wherein DRT1, DRT2 and DRT3 are typical half-tone densities for the nominal dot area for a first type half-tone with lower dot area, a second type half-tone with higher dot area, and a solid-tone field, respectively.

16. Apparatus according to claim 14, wherein said density limits are established wherein DG1_2 and DG2_V are first and second density limits, respectively, and wherein DRT1, DRT2 and DRT3 are typical half-tone densities for the nominal dot area for a first type half-tone with lower dot area, a second type half-tone with higher dot area, and a solid-tone field, respectively.

17. Apparatus according to claim 12, wherein the measuring variable determination device further calculates a dot gain as a measured variable if the type recognition device recognized the print control field as a half-tone field.

18. Apparatus for the analysis of print control fields, comprising:

an electro-optical measuring device to determine a set of color densities of a print control field;

a color recognition device to determine the color of the print control field from the set of color densities;

a type recognition device for recignozign and distinguishing single color solid-tone fields and single half-tone fields by comparing a measured color density of the print color field or a dot area value calculated from the measured color density with a dynamic dot area limit value determined by a typical dot area characteristic or a corresponding density limit, said type recognition device further determining a print control field type from the color densities as one of a given set of print control field types;

a measured value determination device to determine a measuring variable correlated with the type and the color of the print control field determined; and, a display unit to display the correlated measuring variable, the color of the print control field and user guide indications.

19. Apparatus according to claim 18, wherein the display unit displays the dot area value if the type recognition device has recognized the print control field as a half-tone field.

20. Method for the analysis of print control fields, comprising the steps of:

determining a set of color densities of a print control field;

determining relative variables of grayness and color hue errors from said set of color densities, and determining a color of the print control field from said relative variables;

determining print control field type from the set of color densities as one of a given set of print control field types;

determining a measuring variable correlated with the type and the color of the print control field; and, displaying the measuring variable, the color of the print control field and user guide indications.

21. Method for the analysis of print control fields, comprising the steps of:

determining a set of color densities of a print control field;

determining the color of the print control field from the set of color densities;

recognizing and distinguishing single color solid tone fields and half-tone fields, together with half-tone fields of at least two different nominal dot areas, from stored or manually entered nominal dot area values and a stored typical dot area characteristic, and determining print control field type from the color densities as one of a given set of print control field types;

determining a measuring variable correlated with the type and the color of the print control field form the set of color densities; and, displaying the correlated measuring variable, the color of the print control field and user guide indications.

22. Method for the analysis of print control fields, comprising the steps of:

determining a set of color densities of a print control field;

determining the color of the print control field from the set of color densities;

recognizing and distinguishing single color solid-tone fields and single color half-tone fields by comparing a measured color density of the print color field or a dot area value calculated from the measured color density with a dynamic dot area limit value determined by the typical dot area characteristic or a corresponding density limit, and determining print control field type from the color densities as one of a given set of print control field types;

determining a measuring variable correlated with the type and the color of the print control field determined; and, displaying the correlated measuring variable, the color of the print control field and user guide indications.

* * * * *